US012045510B2

(12) United States Patent
Mathew et al.

(10) Patent No.: US 12,045,510 B2
(45) Date of Patent: Jul. 23, 2024

(54) SYNCHRONIZING CONTROL OPERATIONS OF A NEAR MEMORY PROCESSING MODULE WITH A HOST SYSTEM

(71) Applicant: SAMSUNG ELECTRONICS CO., LTD., Suwon-si (KR)

(72) Inventors: Eldho Pathiyakkara Thombra Mathew, Karnataka (IN); Prashant Vishwanath Mahendrakar, Karnataka (IN); Jin In So, Hwaseong-si (KR); Jong-Geon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 17/874,370

(22) Filed: Jul. 27, 2022

(65) Prior Publication Data
US 2023/0046552 A1  Feb. 16, 2023

(30) Foreign Application Priority Data
Aug. 5, 2021  (IN) .............................. 202141035222

(51) Int. Cl.
*G06F 3/06* (2006.01)
(52) U.S. Cl.
CPC .......... *G06F 3/0659* (2013.01); *G06F 3/0607* (2013.01); *G06F 3/0658* (2013.01); *G06F 3/061* (2013.01); *G06F 3/0683* (2013.01)

(58) Field of Classification Search
CPC .............. G06F 3/06; G11C 2207/2254; G11C 29/50008; G11C 29/022; G11C 29/024; G11C 29/02; G11C 29/5004; G11C 11/4096; G11C 11/40603; G11C 11/2257
See application file for complete search history.

(56) References Cited

U.S. PATENT DOCUMENTS

| | | | | |
|---|---|---|---|---|
| 9,805,786 | B1* | 10/2017 | Saito | G11C 11/4097 |
| 10,439,612 | B1* | 10/2019 | Johnson | G11C 29/50008 |
| 10,838,637 | B2* | 11/2020 | Burns | G06F 3/0634 |
| 2006/0044914 | A1* | 3/2006 | Choi | G11C 11/40618 365/222 |
| 2008/0181041 | A1* | 7/2008 | Koshita | G11C 8/06 365/236 |
| 2018/0375692 | A1* | 12/2018 | Wieduwilt | G11C 29/021 |
| 2020/0185025 | A1* | 6/2020 | Kim | G11C 11/4076 |

* cited by examiner

*Primary Examiner* — Khoa D Doan
(74) *Attorney, Agent, or Firm* — F. Chau & Associates, LLC

(57) ABSTRACT

A Near Memory Processing (NMP) module including: a plurality of memory units; an Input/Output (I/O) interface configured to receive commands from a host system, wherein the host system includes a host memory controller configured to access the plurality of memory units; a decoder configured to decode the commands and generate a trigger; and an NMP memory controller configured to: receive the trigger from the decoder; and generate a signal in response to the trigger to synchronize the NMP module with the host system.

16 Claims, 10 Drawing Sheets

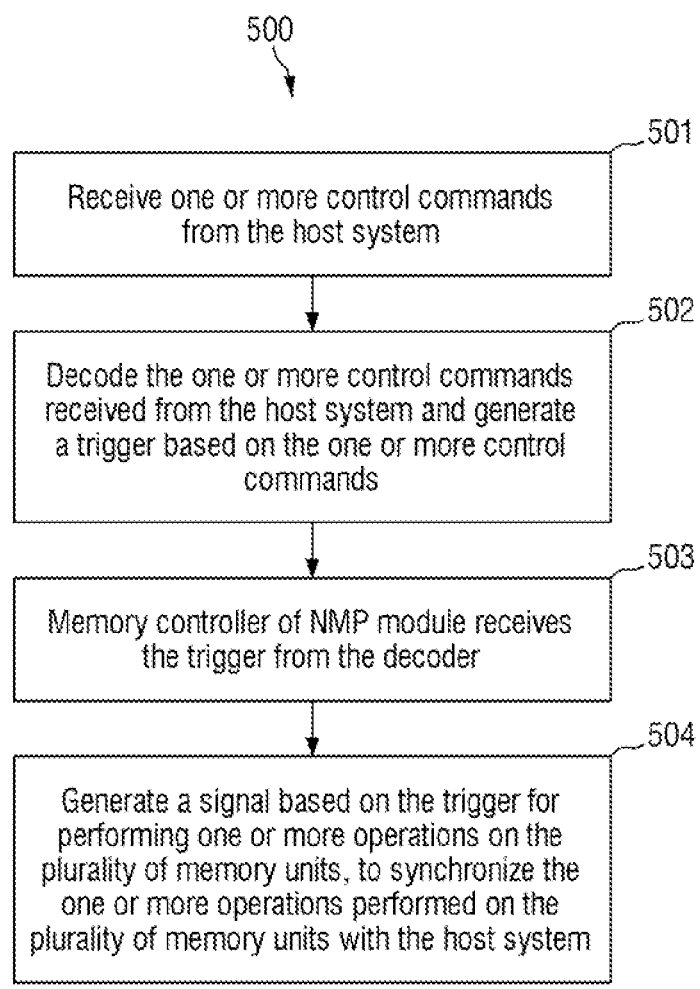

FIG. 7A
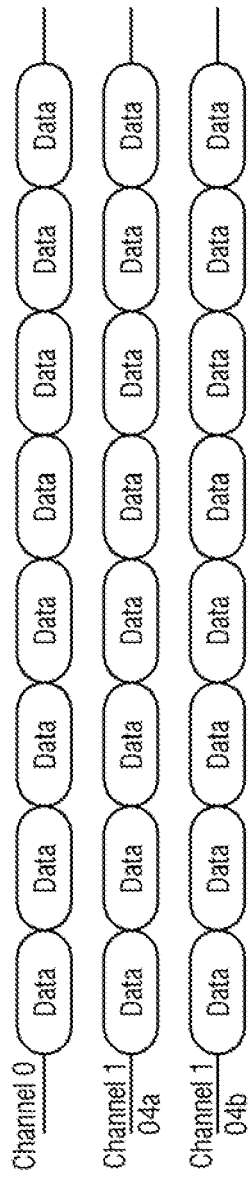
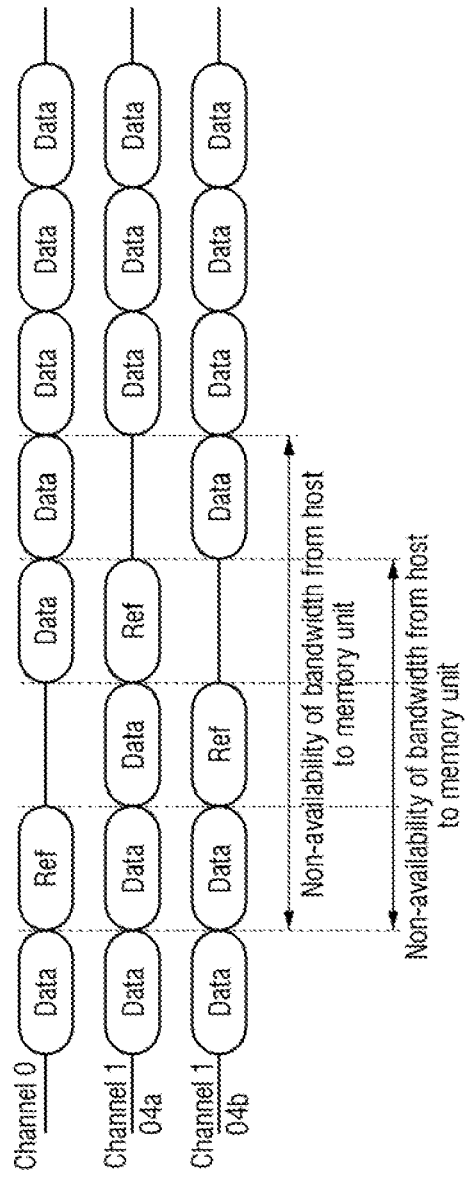

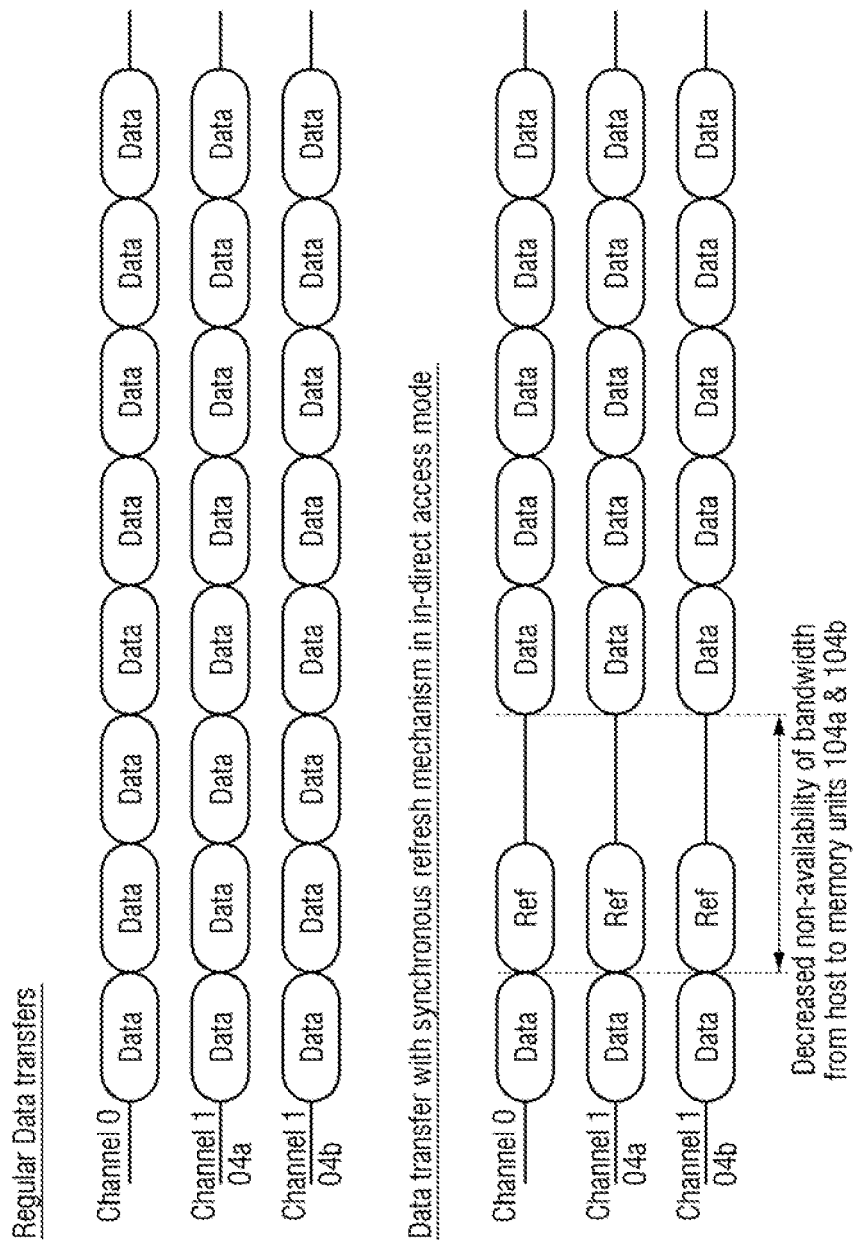

SYNCHRONIZING CONTROL OPERATIONS OF A NEAR MEMORY PROCESSING MODULE WITH A HOST SYSTEM

CROSS-REFERENCE TO RELATED APPLICATION

This application claims priority under 35 U.S.C. § 119 to Indian Patent Application No. 702141035722, filed on Aug. 5, 2021, the disclosure of which is incorporated by re thence herein in its entirety.

TECHNICAL FIELD

10011 The present disclosure relates in general to memory systems. More specifically, the present disclosure relates to synchronizing control operations of a near memory processing module with a host system to optimize a memory system.

DISCUSSION OF RELATED ART

A memory system is an essential component of a computing system. A typical computing system includes a processing unit, for example, as Central Processing Unit (CPU), a memory system and an additional storage, for example, a hard drive. The CPU includes extremely fast memory units, for example, cache. The memory system includes a plurality of memory units, for example, Random Access Memory (RAM), which effectuate communication between the CPU and the additional storage. Advanced Memory systems where processing units are located close to the RAM, may be referred to as Near Memory Processing (NMP) modules. The advanced memory system may be used as a Dual In-Line Memory Module (DIM M) due to its efficiency and capability of supporting more memory units in a single interface. A memory controller of the CPU is configured to access the memory units to perform various operations such as read data, write data, erase data, refresh the memory units, calibrate the memory units and the like. The CPU uses different commands to perform these operations.

An NMP module includes its own processing unit and a memory controller to manage the plurality of memory units. The memory controller of the NMP module functions similar to the memory controller of the CPU and is configured to perform operations such as ZQ calibration of the plurality of memory units and refreshing of the plurality of memory units regularly. Dynamic RAM (DRAM) is one of the most widely used memory units, for example, and the DRAM must be regularly refreshed to retain the data stored therein. While the memory controller of the CPU accesses the plurality of memory units for read/write operations, the memory controller of the CPU provides refresh commands to refresh the memory units at regular intervals. Generally the memory controller of the CPU initiates the read/write operations and when the read/write operations are complete, the memory controller of the CPU releases access of the plurality of memory units and the memory controller of the NMP module may take control of the plurality of memory units. When changing the access of the plurality of memory units from the memory controller of the CPU to the memory controller of the NMP module, refreshing and ZQ calibration of the plurality of memory units may be missed. Since the DRAM needs to be refreshed and calibrated regularly, missed refreshes and calibration may decrease data reliability in the plurality of memory units. For example, when the DRAM is not refreshed regularly, the state of the DRAM is not restored, and the data may be corrupted. In addition, when the DRAM is not calibrated regularly, the voltage or temperature of the DRAM may vary resulting in a drop in the reliability of the data.

SUMMARY

In an embodiment of the present disclosure, there is provided a Near Memory Processing (NMP) module including: a plurality of memory units; an Input/Output (I/O) interface configured to receive commands from a host system, wherein the host system includes a host memory controller configured to access the plurality of memory units: a decoder configured to decode the commands and generate a trigger; and an NMP memory controller configured to: receive the trigger from the decoder; and generate a signal in response to the trigger to synchronize the NMP module with the host system.

In an embodiment of the present disclosure, there is provided a method of synchronizing art NMP module with a host system, the method including: receiving by an I/O interface of the NMP module, one or more control commands from the host system; decoding by a decoder of the NM P module, the one or more control commands received from the host system and generating a trigger; receiving, by an NMP memory controller of the NMP module, the trigger from the decoder; and generating by the NMP memory controller, a signal for operating a plurality of memory units of the NMP module to synchronize the NMP module with the host system.

In an embodiment of the present disclosure, there is provided a memory system including: air NMP module; and a host system configured to access a plurality of memory units of the NMP module; wherein the host system generates one or more control commands after switching of access of the plurality of memory units from the host system to the NMP module; wherein the NMP module: receives the one or more control commands from the host system decodes the one or more control commands; and generates a signal for operating the plurality of memory units to synchronize the NMP module with the host system.

BRIEF DESCRIPTION OF THE DRAWINGS

Embodiments of the present disclosure are now described, by way of example, with reference to the accompanying figures wherein like reference numerals represent like elements and in which:

FIG. 5 shows an example flowchart for synchronizing operations performed on memory units between a host system and an NMP module, in accordance with an embodiment of the present disclosure;

FIG. 613 illustrates waveforms of refresh commands provided by a host system and an NMP module to demonstrate passage of commands from the host system to memory units, in accordance with an embodiment of the present disclosure;

FIG. 7A illustrates waveforms of data signals and refresh commands in conventional systems; and FIG. 7B illustrates waveforms of passage of data signals and refresh commands from the host system to memory units, in accordance with an embodiment of the present disclosure.

Figure 1:
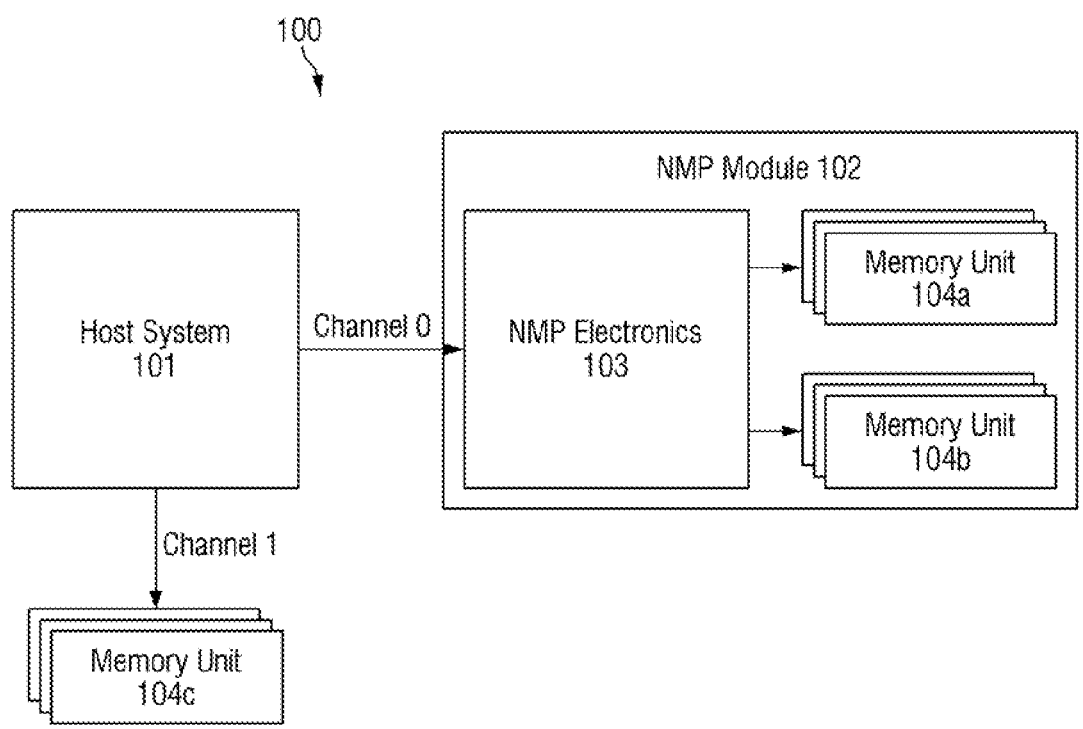
FIG. 1 shows a simplified block diagram of a typical memory system.

It should be appreciated by those skilled in the art that any flow charts, flow diagrams, state transition diagrams, pseudo code, and the like represent various processes which may be represented in a computer readable medium and executed by a computer or processor.

DETAILED DESCRIPTION OF THE EMBODIMENTS

In the present document, the word "exemplary" may mean "serving as an example, instance, or illustration," Any embodiment or implementation of the present subject matter described herein as "exemplary" is not necessarily to be construed as preferred or advantageous over other embodiments.

While the disclosure is subject to various modifications and alternative forms, specific embodiments thereof are shown by way of example in the drawings and will be described in detail below. It should be understood, however that these embodiments are not intended to limit the disclosure to the particular forms disclosed, but on the contrary, the disclosure is intended to cover all modifications, equivalents, and alternative falling within the scope of the inventive concept.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup, device or method. In other words, one or more elements in a system or apparatus proceeded by "comprises . . . a" does not preclude the existence of other elements or additional elements in the system or apparatus.

Embodiments of the present disclosure relate to memory systems. The present disclosure synchronizes operations performed by a host system and a Near Memory Processing (NMP) module. By synchronizing the operations performed by a host system and an NMP module, the memory system is efficiently utilized and performance of the memory system increases. The synchronization is achieved by operating memory units of the NMP module by a memory controller of the NMP module, based on commands received from the host system, FIG. 1 shows a simplified block diagram of a typical memory system (100). The memory system (100) utilising NMP capabilities comprises a host system (101), and an NMP module (102). In one implementation, the NMP module (102) comprises NMP electronics (103) and a plurality of memory units (104*a*, 104*b*). In some implementations, one or more memory, units (104*c*) may reside outside the NMP module (102), The plurality of memory units (104*a*, 104*b*) and the one or more memory units (104*c*) may be Dynamic Random Access Memories (DRAMs). The NMP module (102) may be packaged as a Dual In-line Memory Module (DIMM), The DIMM is a circuit board having the plurality of memory units (104*a*, 104*b*) on both sides of the circuit board. In general, the plurality of memory units (104*a*, 104*b*) are positioned close to a processing unit to increase the speed of execution. Due to advancements in Machine Learning (ML) and Artificial Intelligence (AI) algorithms, which require higher memory bandwidth, additional processing functions are moved closer to the plurality of memory units (104*a*, 104*b*)). For example, components involved in data intensive operations like Multiply and Accumulation (MAC) can be moved closer to the memory unit to improve performance for ML & AI systems. The NMP module (102) may comprise a standalone processing unit.

In some implementations, the host system (101) may be configured to access the plurality of memory units (104*a*. 104*b*) and the one or more memory units (1040 via respective communication channels (channel 0 and channel 1). The host system (101) may access the plurality of memory units (104*a*, 104*b*) and the one or more memory units (104*c*) to read data, to write data, to delete data, to refresh the plurality of memory units (104*a*, 104*b*) and the one or more memory units (104*c*) or to calibrate the plurality of memory units (04*a*, 104*b*) and the one or more memory units (104*c*).

In an implementation, the one or More memory units (104*c*) may be DRAM, Static RAM (SRAM) or any other type of RAM configured as a standalone memory.

In an implementation, the NMP electronics (103) comprises the processing unit for performing In-Memory Processing (IMP). The IMP and NMP together increases efficiency of a computing system.

Figure 2:
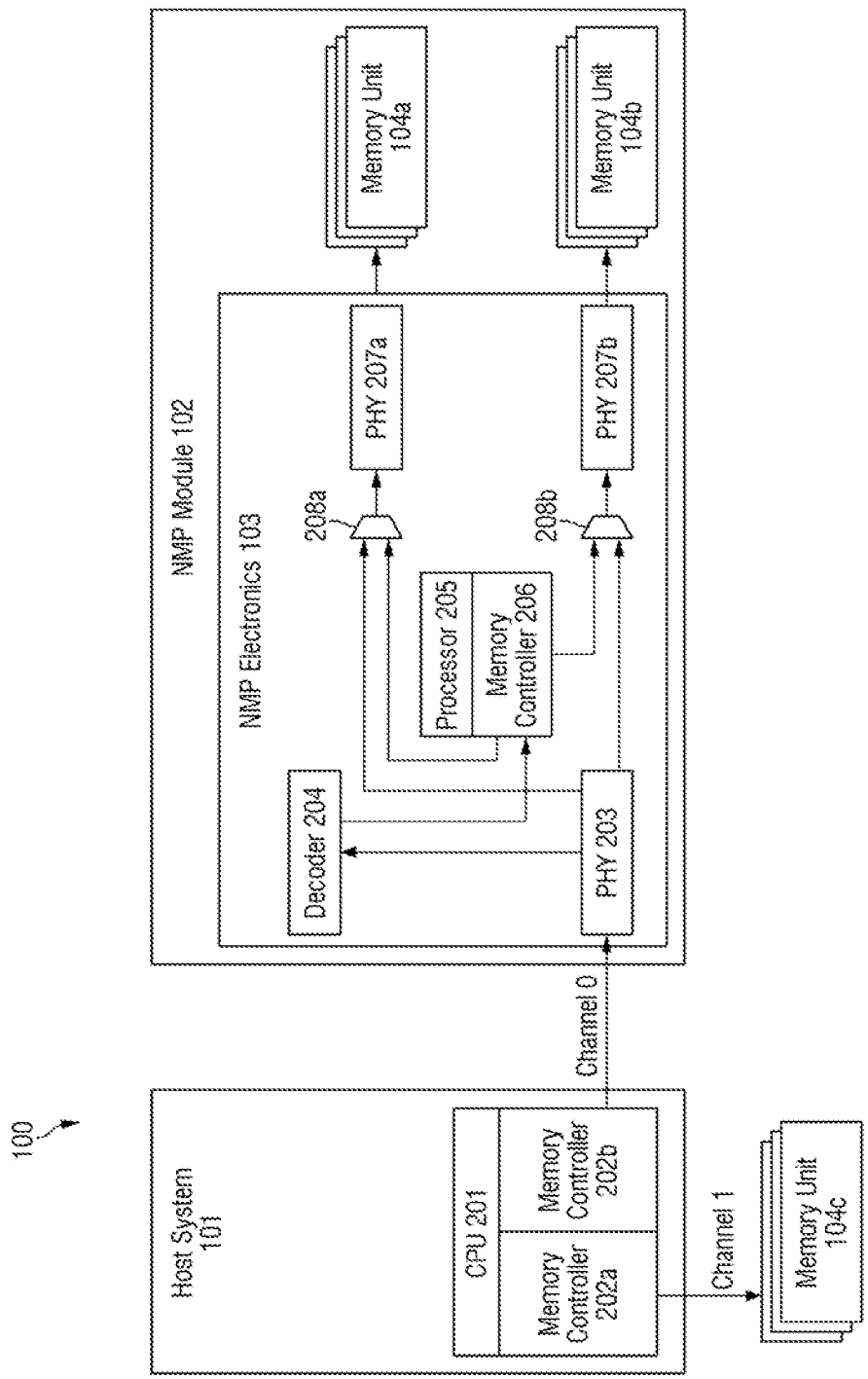
FIG. 2 shows a detailed block diagram of a memory system, in accordance with an embodiment of the present disclosure.

FIG. 2 shows a detailed block diagram of the memory system (100), in accordance with an embodiment of the present disclosure. As shown in FIG. 2, the host system (101) comprises a Central Processing Unit (CPU) (201), a memory controller (202*a*) and a memory controller (202*h*). In other words, the host system (101) may include first and second memory controllers. The CPU (201) may be the processing unit for the computing system. The memory controllers (202*a*, 202*b*) are digital circuits that manage flow of data between the CPU (201), and the plurality of memory units (104*a*, 104*b*) and the one or more memory units (104*c*). The memory controllers (202*a*, 202*b*) facilitate the CPU (201) to perform various operations such as read and write operations. Further, the memory controllers (202*a*, 202*b*) also enable to the CPU (201) to perform refresh and calibration operations when the plurality of memory units (104*a*, 104*b*) are DRAMs.

In an embodiment of the present disclosure, the host system (101) may also comprise one or more physical interfaces to connect to the NMP module (102) and the one or more memory units (104*c*). For example, the NMP module (102) may be connected to the one or more memory units (104*c*) via a dedicated communication channel.

As shown in the FIG. 2, the memory controller (202*h*) can access the plurality of memory units (104*a*, 104*b*) via the NMP electronics (103). For example, the memory controller (202*b*) is communicably coupled with the NMP electronics (103) via communication channel (channel 0). The NMP electronics (103) comprises one or more physical interfaces (203, 207*a*, 207*h*), a decoder (204), a processor (205) and a memory controller (206). The one or more physical interfaces (203, 207*a*, 207*b*) enable the memory controller (202*b*) to access the plurality of memory units (104*a*, 104*h*). The physical interface (203) is configured to receive commands from the host system (101) to access the plurality of memory units (104a, 104b). For example, when the memory controller (2021?) sends a read command to fetch data from memory unit 104b, the physical interface (203) passes the read command to the physical interface (207h) to fetch data present in the memory unit (104b). Likewise, the physical interface (203) is configured to receive other commands such as a write command, a refresh command, a calibrate command, a pre-charge command, a bank activate command and the like. The physical interfaces (203, 207a, 207b) are also referred as Input/Output (I/O) interfaces in the present disclosure. In an embodiment of the present disclosure, the memory controller (202b) is further configured to provide refresh commands at regular intervals. For example, the memory controller (202b) may provide refresh commands around every 7.8 μs for a 2 Gb, 4 Gb or an 8 Gb DRAM. The memory controllers (202a, 202b) are also referred as a host memory controller in the present disclosure.

There can be two states of operations in NMP enabled systems, e.g., a memory access state and an NMP state, A select logic such as one or more multiplexers (208a, 208b) may define the current state of the system. The access to the plurality of memory units (104a, 104b) may be exclusive, e.g., either the host system (101) or the NMP electronics (103) may access the plurality of memory units (104a, 104b) at any point in time. Switching of the one or more multiplexers (208) is important in the system as there are two masters to control operations of the plurality of memory units (104a, 104b), to maintain data reliability.

The decoder (204) may be a circuit configured to decode the commands received from the host system (101). In an embodiment of the present disclosure, the decoder (204) is configured to decode control commands such as the refresh commands and calibrate commands (e.g., ZQ calibration commands) received from the host system (101). In conventional systems, a decoder is configured to decode commands such as a read command and a write command. In addition, the control commands are generated by the NMP electronics in conventional systems. In the present disclosure, the decoder (204) generates a trigger based on the decoded control command. In one embodiment of the present disclosure, the decoder (204) generates a refresh trigger upon decoding the refresh command. In another embodiment of the present disclosure, the decoder (204) generates a ZQ calibration trigger upon decoding the ZQ calibration command.

The processor (205) is configured to process data. Unlike the CPU (201) which can processes data present in the plurality of memory units (104a, 104h) and the one or more memory units (104c), the processor (205) is configured to only process data present in the plurality of memory units (104a, 104b). Since the processor (205) is very close to the plurality of memory units (104a. 104b), the operations can be performed in parallel to the host system (101) and since there is access to data through parallel channels (e.g., channel 0), latency is reduced and permanence is significantly increased. The processor (205) is configured to perform operations such as read, and write, to complete required NMP operations.

The memory controller (206) is configured to manage memory operations of the plurality of memory units (104a, 104b). The functions of the memory controller (206) are similar to the functions of the memory controller (202h) as described above. The memory controller (206) is configured to receive the trigger from the decoder (204) and generate a signal accordingly. The memory controller (206) is also referred as an NMP memory controller in the present disclosure. In an embodiment of the present disclosure, the memory controller (206) generates a refresh signal upon receiving the refresh trigger from the decoder (204). Likewise, the memory controller (206) generates a ZQ calibration signal upon receiving the ZQ calibration trigger from the decoder (204). The memory controller (206) provides the signal (e.g., refresh signal or the ZQ calibration signal) to the plurality of memory units (104a, 104b). In conventional memory systems, the memory controller present in the NMP module and the memory controller present in the host system provide refresh commands and ZQ calibration commands independent of each other. Therefore, the conventional memory systems lack synchronization between the host system and the NMP module for control/maintenance operations. The lack of synchronization leads to missed refreshes and improper calibration of the plurality of memory units. Further, asynchronous refreshes leads to a delay in data response from the plurality of memory units, in the present disclosure, however, the decoder (204) decodes the refresh commands and ZQ calibration commands provided by the host system (101) and enables the memory controller (206) to generate the refresh signals and the ZQ calibration signals. Therefore the commands provided by the host system (101) are synchronized with the signals provided by the memory controller (206). In an embodiment of the present disclosure, the NMP module (102) receives the commands from the host system (101) during/after switching the access of the plurality of memory units (104a, 104b) from the host memory controller (202b) to the NMP memory controller 1206). This mechanism will guarantee smooth switching of the one or more multiplexers (208a, 208b), hence guarantee data reliability.

Figure 3A:
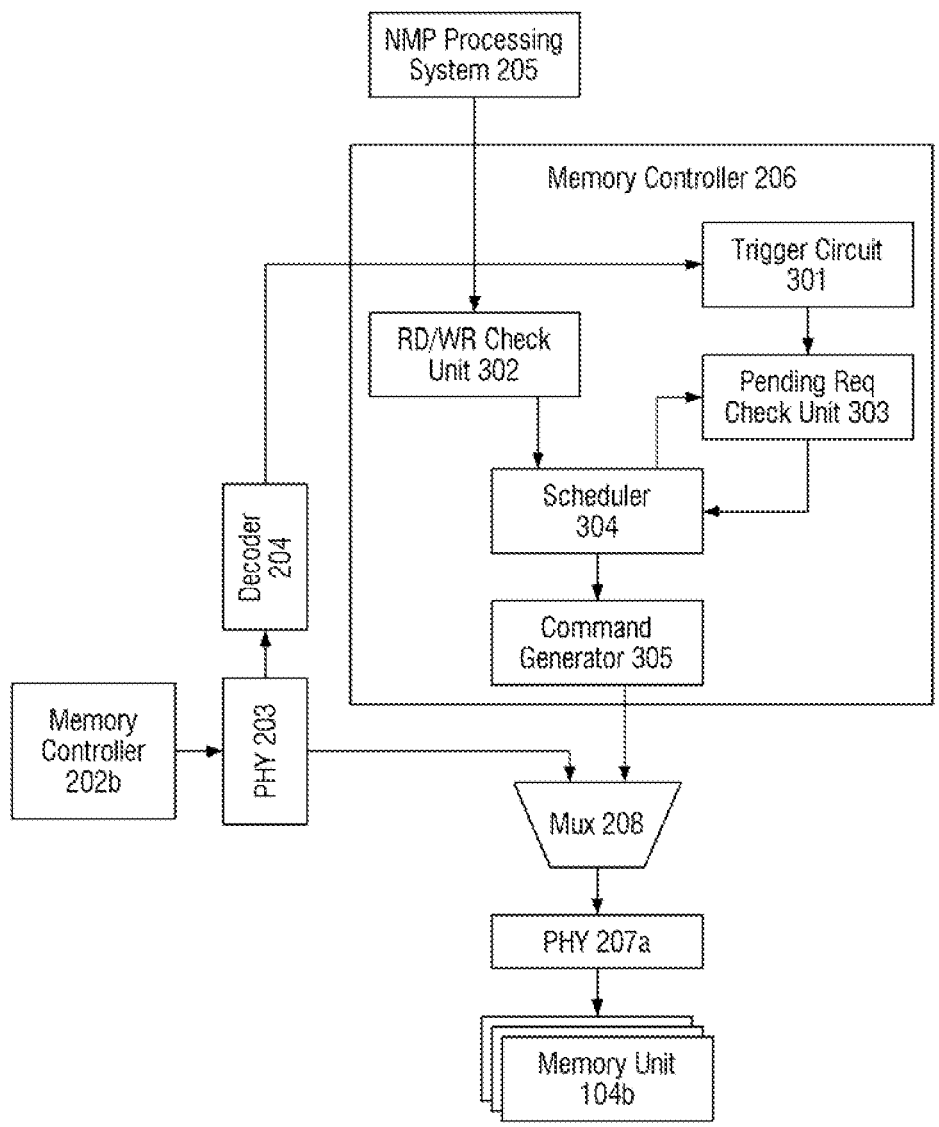
FIG. 3A shows a block diagram of a memory controller of a Near Memory Processing (NMP) module, in accordance with an embodiment of the present disclosure.
Figure 3B:
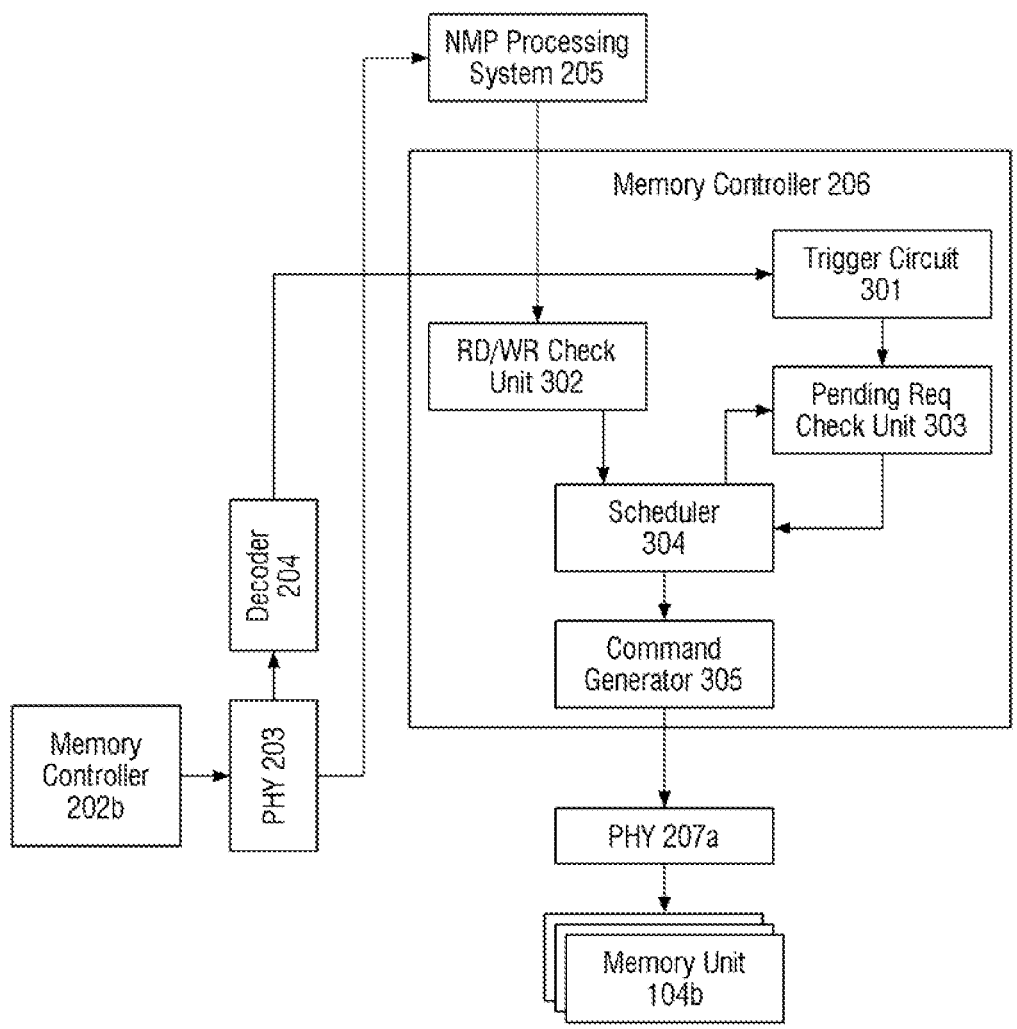
FIG. 3B shows a block diagram of a memory controller of an NMP module, in accordance with an embodiment of the present disclosure.

The NMP enabled memory system can be classified into two categories based on the memory access mechanism employed. When the host memory controller (202b) accesses the plurality of memory units (104a, 104b), the commands are provided in either a direct access mode or an indirect access mode, illustrated in FIG. 3A and FIG. 3B, respectively. The present embodiment is based on the direct access mode. FIG. 3A and FIG. 3B show differences in the access modes.

FIG. 3A illustrates the direct access mode. In the direct access mode the host memory controller (202b) has direct access to the memory unit (e.g., 104h), e.g., the host memory controller (202b) provides the commands to the plurality of the memory units (104b) directly via the physical interfaces (203, 207b). As shown, the memory controller (206) comprises a trigger circuit (301), a React/Write (RD/WR) check unit (302), a pending requests check unit (303), a scheduler (304), and a command generator (305). FIG. 3A further illustrates a multiplexer 208 between the physical interface 203 and the physical interface 207a. The multiplexer 208 is also provided between the physical interface 207a and the command generator 305.

In an embodiment of the present disclosure, the trigger circuit (301) is configured to receive the trigger from the decoder (204). For example, the trigger may be a refresh trigger or a ZQ calibration trigger. In the direct access mode, the decoder (204) may be activated only during or after switching of the access of the memory units (104b) from the host memory controller (202b) to the NMP memory controller (206). The trigger generated by the decoder (204) may be denoted by logic HIGH or logic LOW. For example, the refresh trigger may be the logic HIGH and the ZO calibration may be the logic LOW. In an embodiment of the present disclosure, the decoder (204) may also indicate, via a logic HIGH or LOW, the reception of the command from the host memory controller (202b). The trigger circuit (301) may interpret the trigger generated by the decoder (204) when the decoder (204) is active.

In ran embodiment of the present disclosure, the RD/WR check unit (302) is configured to cheek if a read or write operation is pending from the NMP processor (205) to the memory unit (104b).

In an embodiment of the present disclosure, the pending requests check unit (303) is configured to check if previous control requests are pending. For example, when a first refresh trigger is received from the decoder (204), the memory unit (104h) may be used for a read operation by the processor (205) and the first refresh trigger may be pipelined. Further, when a second refresh trigger is received from the decoder (204), the pending requests check unit (303) may indicate that the first refresh trigger is pending and may add the second refresh trigger to the pipeline.

In an embodiment of the present disclosure, the scheduler (304) is configured to schedule the operations performed on the memory unit (104b). In an embodiment of the present disclosure, the scheduler (304) may follow different patterns to allow peripheral components to access the memory unit (104b) to perform different operations. In an embodiment of the present disclosure, the scheduler (304) may also pipeline the operations. In an embodiment of the present disclosure, the scheduler (304) may optimize the scheduling by pipelining the operations for different banks of the memory unit (104h). For example, while a first bank is pre-charged, a second bank may be activated, and a third hank may be accessed for a read operation. The scheduler (304) may take inputs from the RD/WR check unit (302) and the pending requests check unit (303) to schedule the operations.

In an embodiment of the present disclosure, the command generator (305) is configured to generate the signal on a DRAM interface based on the scheduled operation. For example, the command generator (305) is configured to generate a read signal, a write signal, a refresh signal, a ZQ calibration signal and the like. The signals are provided to the memory unit (104h) via the physical interface (207a).

FIG. 3B illustrates the indirect access mode. In the indirect access mode the host memory controller (202b) accesses the memory unit (104b) indirectly via the NMP memory controller (206). As can be seen in the FIG. 3B, the physical interface (203) is not connected to the physical interface (207a). For example, there is no multiplexer positioned along a communication path directly between the physical interface (203) and the physical interface (207a). Hence, the commands provided by the host memory controller (202b) are routed via the NMP memory controller (206). Thus, there exists a delay in the indirect access mode. The working of the components of the NMP memory controller (206) are described above and will not be repeated here.

In an embodiment of the present disclosure, the NMP module (102) may include a plurality of NMP memory controllers. Each memory controller may manage memory operations of different DIMMS.

Figure 4:
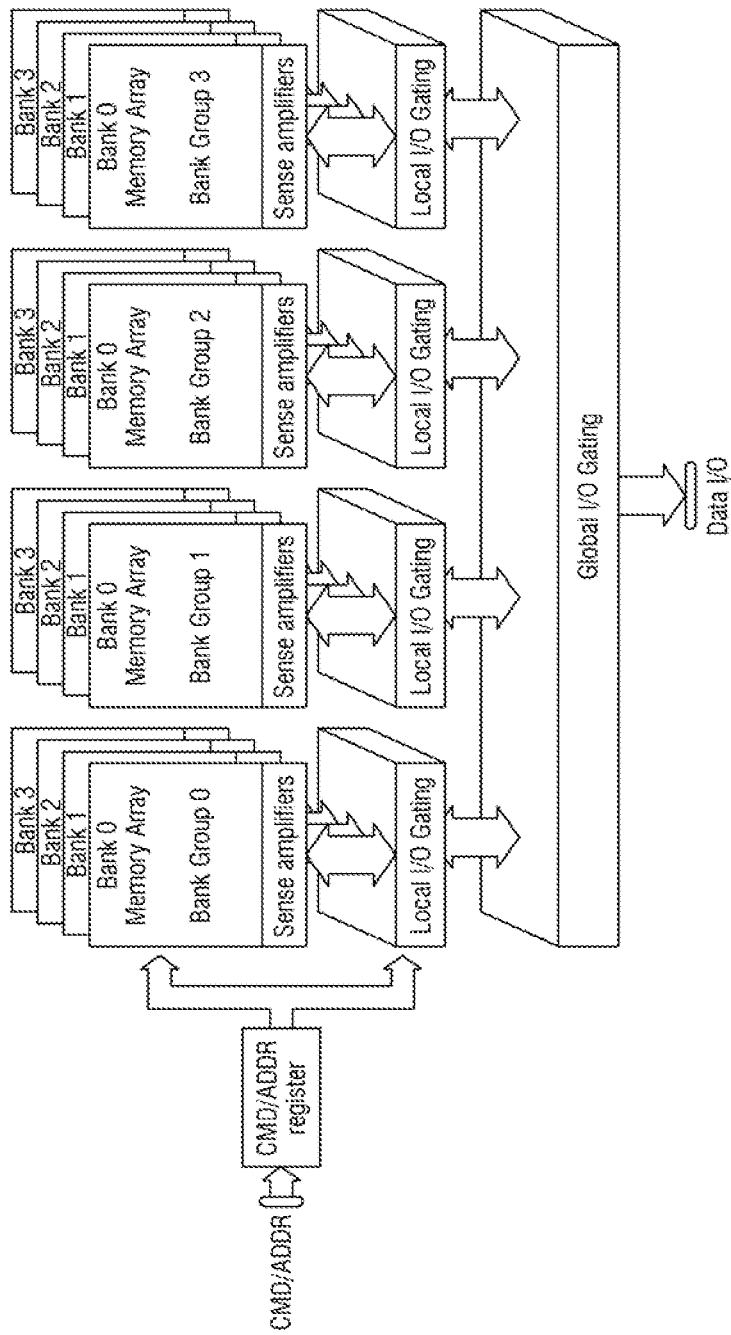
FIG. 4 shows a structure of a memory unit, in accordance with an embodiment of the present disclosure.

FIG. 4 shows a structure of a memory unit, in accordance with an embodiment of the present disclosure. FIG. 4 shows a broad level structure of the memory unit (e.g., 1044). The memory unit (104b) is organized into a plurality of bank groups (e.g., Bank Group 0 to Bank Group 3) and a plurality of banks (e.g., Bank 0 to Bank 3), Each bank group comprises the plurality of banks. Further, each bank comprises a plurality of rows and a plurality of columns. A command (CMD) from either the host memory controller (20n) or the NMP memory controller (206) comprises an operation to be performed and a physical address (ADDR). The physical address comprises a bank group field, a bank field, a row field and a column field. Each bank comprises one or more memory arrays, one or more row decoders, one or more column decoders and one or more sense amplifiers. Once the bank group and bank are identified, the row field of the address activates a line in the memory array. The activated line in the memory array may be a "word line" and the activated word line reads data from the memory array into a respective sense amplifier. The column field is then used to read a part of the data that is loaded into the sense amplifier. The width of the column is referred to as the "bit line". In an embodiment of the present disclosure, the commands provided by the host memory controller (202b) may be targeted to one or more banks of the memory unit (104h) from the plurality of banks. The NMP memory controller (206) is configured to identify one or more target banks from the plurality of banks upon receiving the trigger from the decoder (204). In an embodiment of the present disclosure, the trigger comprises the command (CMU) and the physical address (ADDS) of the memory unit (104b). Further, the NM P memory controller (206) generates and provides the signal to the targeted one or more banks.

The memory unit 104b of FIG. 4 further shows global I/O gating through which data is input and output, and a plurality of local I/O gating disposed between respective bank groups and the global gating. A command/address register is further provided through which the command (CMD) and physical address (ADDR) are received.

FIG. 5 shows an example flowchart for synchronizing operations performed on the plurality of memory units (104a, 104b) between the host, system (101) and the NMP module (102).

As illustrated in FIG. 5, the method (500) may comprise one or more steps. The method (500) may be described in the context of computer executable instructions. For example, computer executable instructions can include routines, programs, objects, components, data structures, procedures, modules, and functions, which perform particular functions or implement particular abstract data types.

The order in which the method (500) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

The steps of method (500) are performed during/after switching access of the plurality of memory units (104a, 1.04b) from the host system (101) to the NMP module (102).

At step (501), the physical interface (203) of the NMP module (102) receives one or more control commands from the host system (101), In an embodiment of the present disclosure, during or after switching the access, the host system (101) is configured to provide one or more control commands. The one or more control commands includes, but is not limited to, the refresh command, the ZQ calibration command, a self-refresh command and the like.

In an embodiment of the present disclosure, the plurality of memory units (104a, 104b)) needs to be refreshed at regular intervals of time to retain data. Typically, the plurality of memory units (104a, 104b) are refreshed every 7.8 μs. The interval is called as refresh interval (tRFI). In an embodiment of the present disclosure, the time duration for which the plurality of memory units (104a. 104h) are refreshed is called as refresh cycle (tRFC). In an embodiment of the present disclosure, the refresh cycle (tRFC) may be 550 ns. The refresh command may comprise the physical addresses of the plurality of memory units (104a, 104b) that needs to be refreshed. In an embodiment of the present disclosure, the host memory controller (202b) may include a refresh counter that may note the last refresh command provided while accessing the plurality of memory units (104a, 104b). Based on the data in the refresh counter, the host memory controller (202h) provides subsequent refresh commands to the NMP module (102) for refreshing the plurality of memory units (104a, 104b).

When a DRAM is powered-up, the DRAM may obtain various states before obtaining an operation state. Hence, the voltage values of the DRAM may not correspond to specified values. Therefore, the ZQ calibration is required upon powering-up the DRAM, to calibrate the voltage values of the DRAM. Further, the ZQ calibration may be performed at regular intervals to retain the voltage values of the DRAM, which may vary due to changes in temperature and voltage variations in the memory system (100). Each data. (DQ) pin the DRAM is bidirectional, which allows read and write operations. Each DQ pin circuit is associated with resistor legs (e.g., 240 ohms). The resistor legs may be tuned in order to calibrate the DQ pins. Each DQ pin comprises a DI) calibration unit and a ZQ pin to which an external precision resistor is connected. The external precision resistor acts as a reference to the DQ pin and remains at 240 ohms at all temperatures. When a ZQ calibration (ZQCL) command is issued during initialization, the DQ calibration unit is enabled and generates a tuning value. The tuning value is then copied over to each DQ pin. In an embodiment of the present disclosure, the ZQ calibration is also performed at regular intervals to account for temperature and voltage variations. ZQ Calibration Short (ZQCS) commands are provided at regular intervals to calibrate the DQ pins. In an embodiment of the present disclosure, the host memory controller (202h) may provide the ZQ calibration (ZQCL) command during direct or indirect access of the plurality of memory units (104a, 104b). Further, when the access is switched, the host memory controller (202b) is configured to provide the ZQ calibration short (ZQCS) commands.

At step (502), the decoder (204) decodes the one or more control commands provided by the host memory controller (202b). Further, the decoder (204) generates the trigger based on the one or more control commands. The below table shows the one or more control commands provided by the host memory controller (202b) based on the Joint Electron Device Engineering Council (JDEC) standard.

Where,
BCS=Bank Group Address,
BA=Bank. Address,
RA=Row Address,
CA=Column Address,
BC_n=Burst Chop,
X=Don't Care,
V=Valid The table 1 may be stored m the host system (101) and the NMP module (102). The host memory controller (202b) and the decoder (204) may each use the table 1 to generate and decode the one or more control commands. In one embodiment of the present disclosure, the decoder (204) may be configured to decode only the one or more control commands after the host memory controller (202b) has switched access. Further, the decoder (204) decodes the one or more control commands when the command fields have the logic levels as shown in the table 1 and generates an appropriate trigger. When the decoder (204) decodes that the one or more commands is a refresh command, the decoder (204) generates the refresh trigger. Likewise, the decoder (204) generates the ZQ calibration trigger upon decoding that the one or more commands is a ZQ calibration command.

At step (503) the NMP memory controller (206) receives the trigger from the decoder (204). The electronic components of the NMP memory controller (206) are used to receive and process the trigger. For example, the trigger circuit (301) receives the trigger from the decoder (204). Further, the scheduler (304) schedules the received memory operation based on pending requests and an ongoing memory operation. As described above, the scheduler (304) may schedule the memory operations using a variety of techniques.

At step (504), the NMP memory controller (206) generates the signal to perform the memory operations on the plurality of memory units (I 04a, 104b). The command generator (305) of the NMP memory controller (206) generates an appropriate signal based on the trigger received from the decoder (204), When the refresh trigger is received, the signal generator (305) generates the refresh signal. Likewise, when the ZQ calibration trigger is received, the command generator (305) generates the ZQ calibration signal. In an embodiment of the present disclosure, the signal may be provided to the plurality of Memory units (104a, 104b) via the physical interface (207a). The signal may be used to synchronize the one or more operations performed on the plurality of memory units (104a, 104b) with the host system (101).

TABLE 1

| Function | Abbreviation | CKE Previous Cycle | CKE Current Cycle | CS_n | ACT_n | RAS_n/ A16 | CAS_n/ A15 | WE_n/ A14 | BG0 - BG1 | BA0 - BA1 | C2-20 | A12/ BC_n | A17, A13, A11 | A10/ AP | A0- A9 | NOTE |
|---|---|---|---|---|---|---|---|---|---|---|---|---|---|---|---|---|
| Refresh | REF | H | H | L | H | L | H | V | V | V | V | V | V | V | V | |
| Belt Refresh Entry | SiRE | H | L | L | H | L | H | V | V | V | V | V | V | V | V | 7.9 |
| ZQ calibration Long | ZQCL | H | H | L | H | H | L | V | V | V | V | V | V | H | V | |
| ZQ calibration Short | ZQCS | H | H | L | H | H | L | V | V | V | V | V | V | L | V | |

Figure 6A:
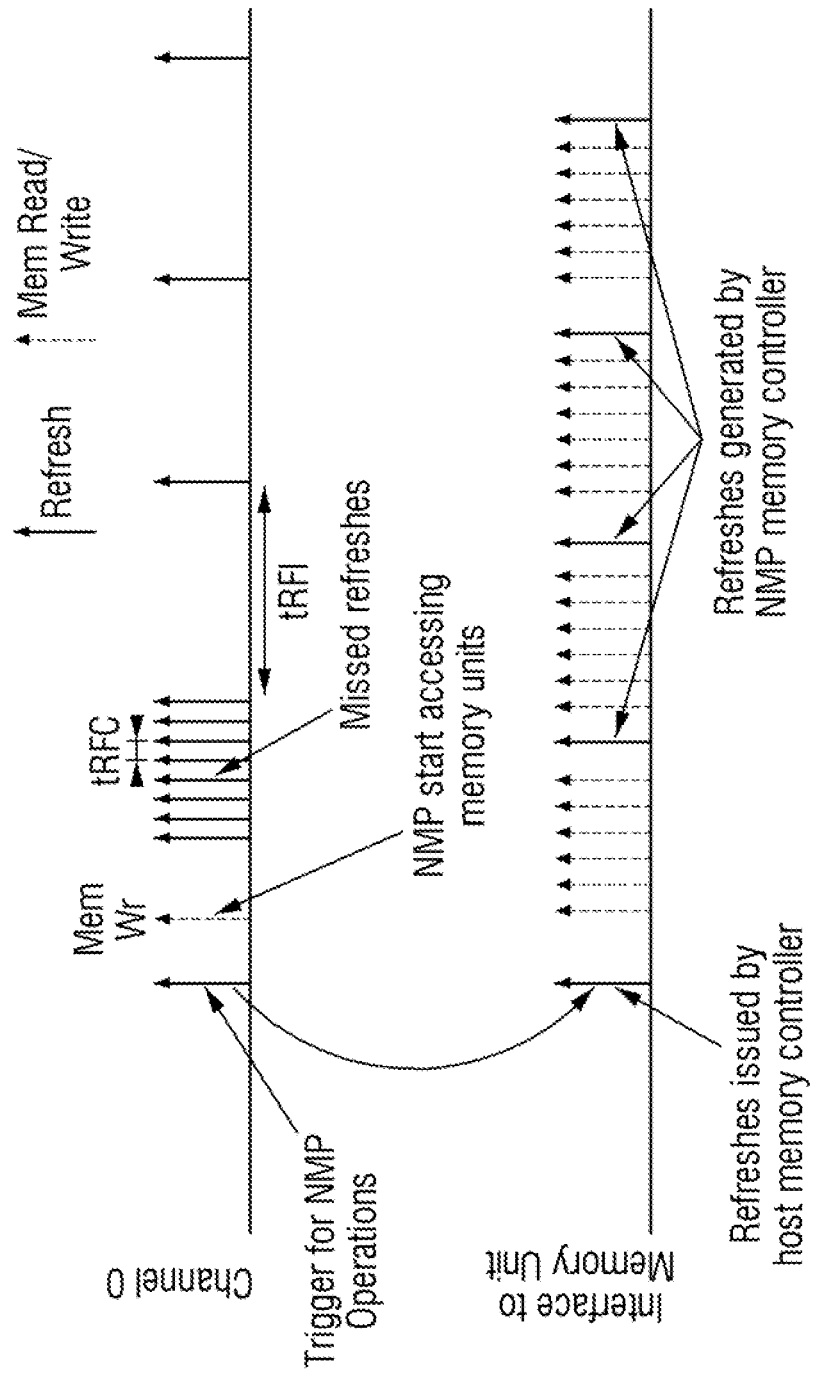
FIG. 6A illustrates waveforms of refresh commands provided by a host system and an NMP module in conventional systems.

FIG. 6A illustrates refresh signals provided in conventional memory systems in the direct access mode. As can be seen in the FIG. 6A, after switching the access, the refresh signals pending at the host system (101) are not provided to the plurality of memory units (104a, 104b) to refresh the DQ pins. Therefore, after performing the memory operation by the host system (101), due to missed refreshes, the data loss may occur, or integrity of the data may be decreased.

Figure 6B:
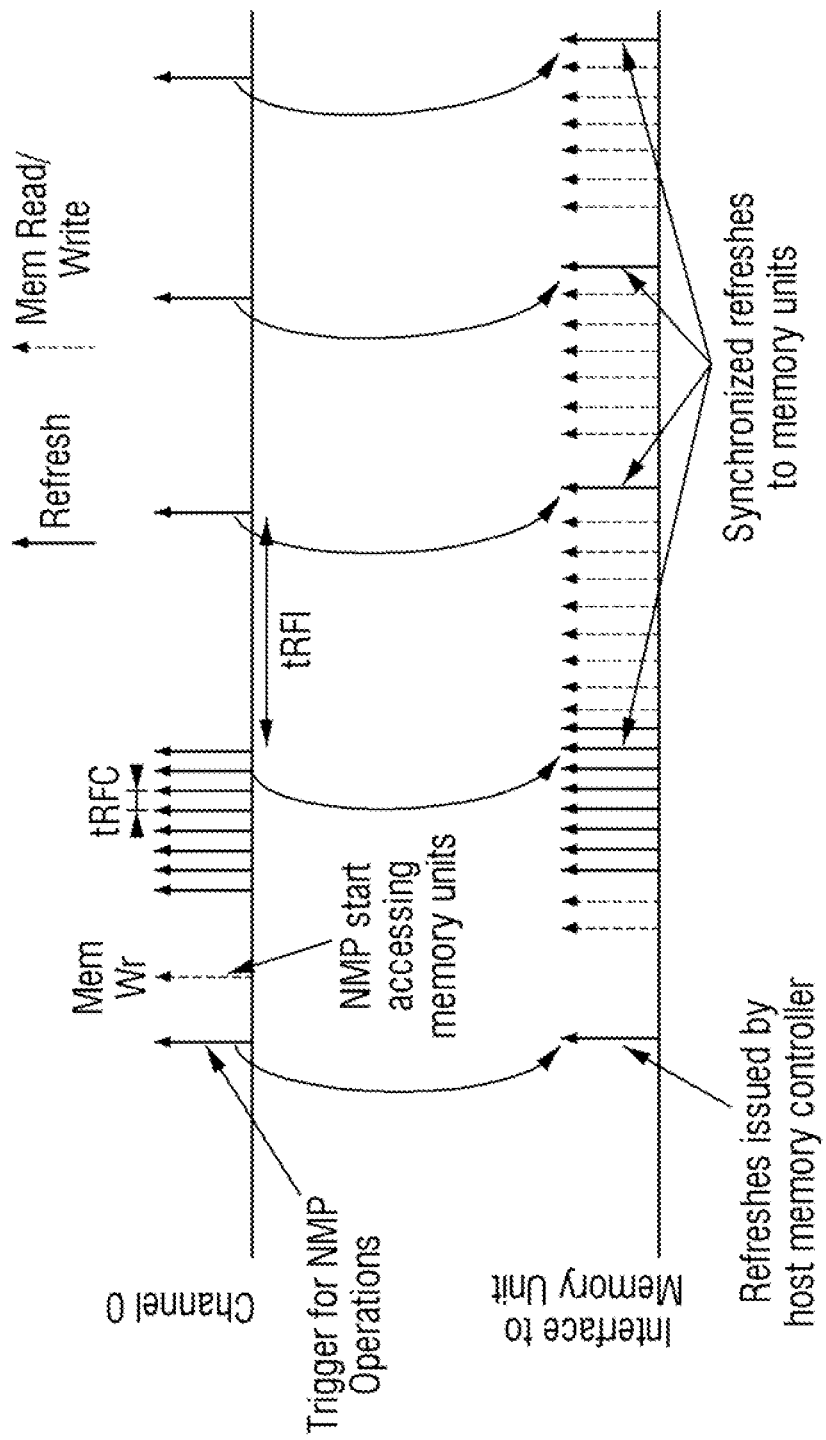

FIG. GB illustrates refresh signals provided according to an embodiment of the present disclosure in the direct access mode. As seen in the FIG. 6B, the refresh commands are synchronized between the host system (101) and the NMP module (102). Hence, the plurality of memory units (104a, 104h) are refreshed at regular intervals of time. Likewise, the ZQ calibration commands are also provided in a synchronized manner. Therefore, the voltage level of the DQ pins are maintained at a required value, thus increasing the integrity of the data.

FIG. 7A illustrates refresh signals provided in conventional memory systems in the indirect access mode. As can be seen in FIG. 7A, during regular data transfers over three DRAM interfaces e.g., Channel 0. Channel 1 (04a), Channel 1 (04b)), there is no interruption during a continuous read or write operation. Each DRAM interface may be managed by a respective NMP memory controller. Each memory controller may have its own schedule for providing refresh signals to a respective DRAM interface. Since refresh cycles of all the DRAMs are not synchronized, the latency of read commands are high because refreshes may interrupt a read request to the plurality of memory units (104a, 104b)).

FIG. 7B illustrates refresh signals provided according to an embodiment of the present disclosure in the indirect access mode. As seen in FIG. 7B, the refresh commands are synchronized between the host system (101) and the NMP module (102). Specifically, each of the NMP memory controllers is synchronized with the host memory controller (202b). Hence, the plurality of memory units (104a, 104b) are refreshed at synchronously. Therefore, the latency of read commands is minimal in comparison to the conventional approach of FIG. 7A, Likewise, the ZQ calibration commands are also provided in a synchronized manner. Therefore, the voltage level of the DQ pins are maintained at required value, thus increasing the integrity of the data.

In an embodiment of the present disclosure, latency in a read operation is reduced. Further, the inventive mechanism increases performance of the memory system.

The terms "an embodiment", "embodiment", "embodiments", "the embodiment", "the embodiments", "one or more embodiments", "some embodiments", and "one embodiment" may mean "one or more (but not all) embodiments of the invention(s)" unless expressly specified otherwise.

The terms "including", "comprising", "having" and variations thereof may mean "including but not limited to", unless expressly specified otherwise.

The enumerated listing of items does not imply that any or all of the items are mutually exclusive, unless expressly specified otherwise. The terms "a". "an" and "the" may mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, when more than one device or article is described herein (whether or not they cooperate), it will be readily apparent that a single device/article may be used in place of the more than one device or article or a different number of devices/articles may be used instead of the shown number of devices or programs. The functionality and/or features of a device may be alternatively embodied by one or more other devices which are not explicitly described as having such functionality/features. Thus, other embodiments of the invention need not include the device itself.

The illustrated operations of FIG. 0.5 show certain events occurring in a certain order In alternative embodiments of the present disclosure, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Herein, the disclosure of the embodiments of the invention is intended to be illustrative, but not limiting, of the scope of the invention, which is set forth in the following claims.

While various aspects and embodiments of the invention have been disclosed herein, other aspects and embodiments will be apparent to those skilled in the art.

What is claimed is:

1. A Near Memory Processing (NMP) module, comprising:
   a plurality of memory units;
   an Input/Output (I/O) interface configured to receive commands from a host system, wherein the host system includes a host memory controller configured to access the plurality of memory units, wherein the commands comprise a refresh command and a ZQ calibration command;
   a decoder configured to decode the commands and generate a trigger; and
   an NMP memory controller configured to:
   receive the trigger from the decoder; and
   generate a signal in response to the trigger to synchronize the NMP module with the host system.

2. The NMP module as claimed in claim 1, wherein the decoder generates a refresh trigger or a ZQ calibration trigger.

3. The NMP module as claimed in claim 1, wherein each of the plurality of memory units is a Dynamic Random Access Memory (DRAM).

4. The NMP module as claimed in claim 1, wherein the plurality of memory units is arranged in a plurality of banks.

5. The NMP module as claimed in claim 1, wherein the NMP memory controller is configured to:
   identify one or more target banks from a plurality of banks upon receiving the trigger; and
   generate and provide the signal to the one or more target banks.

6. The NMP module as claimed in claim 1, wherein the I/O interface receives the commands from the host system during/after switching of access of the plurality of memory units from the host memory controller to the NMP memory controller.

7. A method of synchronizing a Near Memory Processing (NMP) module with a host system, the method comprising:

receiving by an Input/Output (I/O) interface of the NMP module, one or more control commands from the host system, wherein the one or more control commands comprise a refresh command and a ZQ calibration command:

decoding by a decoder of the NMP module, the one or more control commands received from the host system and generating a trigger;

receiving, by an NMP memory controller of the NMP module, the trigger from the decoder; and generating by the NMP memory controller, a signal for operating a plurality of memory units of the NMP module to synchronize the NMP module with the host system.

8. The method as claimed in claim 7, wherein the trigger is a refresh trigger or a ZQ calibration trigger.

9. The method as claimed in claim 7, wherein the signal is a refresh signal or a ZQ calibration signal.

10. The method as claimed in claim 7, wherein each of the plurality of memory units is a Dynamic Random Access Memory (DRAM).

11. The method as claimed in claim 7, wherein the plurality of memory units are arranged in a plurality of banks.

12. The method as claimed in claim 7, wherein the operating the plurality of memory units comprises:
identifying one or more target banks from a plurality of banks upon receiving the trigger; and
generating and providing the signal to the one or more target banks.

13. The method as claimed in claim 7, wherein the one or more control commands are received from the host system during/after switching of access of the plurality of memory units from the host memory controller to the NMP memory controller.

14. A memory system, comprising:
a Near Memory Processing (NMP) module; and
a host system configured to access a plurality of memory units of the NMP module;
wherein the host system generates one or more control commands after switching of access of the plurality of memory units from the host system to the NMP module, wherein the one or more control commands comprise a refresh command and a ZQ calibration command;
wherein the NMP module:
receives the one or more control commands from the host system;
decodes the one or more control commands; and
generates a signal for operating the plurality of memory units to synchronize the NMP module with the host system.

15. The memory system of claim 14, wherein the signal is a refresh signal or a ZQ calibration signal.

16. The memory system of claim 14, wherein at least one of the plurality of memory units is a Dynamic Random Access Memory (DRAM).

* * * * *